(12) United States Patent
Kochumalayil et al.

(10) Patent No.: US 10,035,890 B2
(45) Date of Patent: Jul. 31, 2018

(54) XYLOGLUCAN FILM (71) Applicant: Cellutech AB, Stockholm (SE)

(72) Inventors: Jose Joby Kochumalayil, London (CA); Lars Berglund, Åkersberga (SE)

(73) Assignee: Cellutech AB, Stockholm (SE)

( * ) Notice: Subject to any disclaimer, the term of this patent is extended or adjusted under 35 U.S.C. 154(b) by 0 days.

(21) Appl. No.: 15/032,284

(22) PCT Filed: Oct. 29, 2014

(86) PCT No.: PCT/EP2014/073239
§ 371 (c)(1),
(2) Date: Apr. 26, 2016

(87) PCT Pub. No.: WO2015/063163
PCT Pub. Date: May 7, 2015

(65) Prior Publication Data
US 2016/0251488 A1    Sep. 1, 2016

(30) Foreign Application Priority Data

Oct. 29, 2013 (SE) ...................................... 1351283

(51) Int. Cl.
*C08J 5/18* (2006.01)
*C09D 105/14* (2006.01)
*C08B 37/00* (2006.01)

(52) U.S. Cl.
CPC ............. *C08J 5/18* (2013.01); *C08B 37/0057* (2013.01); *C09D 105/14* (2013.01); *C08J 2305/14* (2013.01)

(58) Field of Classification Search
None
See application file for complete search history.

(56) References Cited

U.S. PATENT DOCUMENTS

| 7,311,933 B2 * | 12/2007 | Bringley | B65D 81/28 426/124 |
| 2011/0229698 A1 * | 9/2011 | Rasmussen | B29C 70/46 428/195.1 |
| 2012/0216706 A1 | 8/2012 | Kochumalayil et al. | |
| 2014/0154756 A1 * | 6/2014 | Nelson | C08B 15/08 435/135 |

FOREIGN PATENT DOCUMENTS

| EP | 2698429 | 2/2014 |
| WO | 2011040871 | 4/2011 |

(Continued)

OTHER PUBLICATIONS

"Bioinspired and Highly Oriented Clay Nanocomposites With a Xyloglucan Biopolymer Matrix: Extending the Ranbge of Mechanical and Barrier Properties". Joby Kochumalayil et al. Biomacromolecules, vol. 14, p. 84-91, published Nov. 30, 2012.*

(Continued)

*Primary Examiner* — Melvin C Mayes
*Assistant Examiner* — Colette Nguyen
(74) *Attorney, Agent, or Firm* — Greer, Burns & Crain, Ltd.

(57) ABSTRACT

The present invention relates to films comprising a xyloglucan comprising not more than 11 mol % galactose residues, as well as a method for making such films, and its use as an oxygen barrier.

15 Claims, 8 Drawing Sheets (56) References Cited

FOREIGN PATENT DOCUMENTS

WO WO2011/040871 * 4/2011
WO 2012150904 11/2012

OTHER PUBLICATIONS

International Searching Authority, International Search Report, PCT/EP2014/073239, dated Jan. 12, 2015.
Joby Kochumalayil et al: "Tamarind seed xyloglucan—a thermostable high-performance biopolymer from non-food feedstock", Journal of Materials Chemistry, Jan. 1, 2010, pp. 4321-4327, vol. 20, No. 21, Royal Society of chemistry, GB.
Joby J Kochumalayil: "Xyloglucan-based polymers and nanocomposites—modification, properties and barrier film applications",Doctoral Thesis, KTH Chemical Science and Engineering, Dec. 21, 2012, pp. I-X, 1-61.
S L Molinarolo: "Sorption of Xyloglucan Onto Cellulose Fibers", Dissertation, Lawrence University, The Institute of Paper Chemistry, Appleton, Wisconsin, 1989; pp. 4-5, 31-32, 37, 60; tables 2, 3, 6, 7, 9 and 6.
J J Kochumalayil: "Nacre-Mimetic Clay/Xyloglucan Bionanocomposites: A Chemical Modification Route for Hygromechanical Performance at High Humidity", Biomacromolecules, vol. 14, Oct. 1, 2013, pp. 3842-3849.
J J Kochumalayil: "Bioinspired and Highly Oriented Clay Nanocomposites with a Xyloglucan Biopolymer Matrix: Extending the Range of Mechanical and Barrier Properties", Biomacromolecules, vol. 14, Oct. 1, 2013, pp. 84-91.

* cited by examiner

Figure 1 a) XXXG

Figure 1 b) XLXG

Figure 1 c) XXLG

Figure 1 d) XLLG

XYLOGLUCAN FILM

This application is a U.S. National Phase under 35 U.S.C. § 371 of International Application No. PCT/EP2014/073239, filed Oct. 29, 2014, which claims priority under 35 U.S.C. §§ 119 and 365 to Swedish Patent Application No. 1351283-5, filed Oct. 29, 2013.

FIELD OF THE INVENTION

The present invention relates to films comprising a xyloglucan comprising not more than 11 mol % galactose residues, as well as a method for making such films and its use as an oxygen barrier.

TECHNICAL BACKGROUND

Oxygen barrier and mechanical properties at high humidity are often critical in materials design for food packaging. Transmission of oxygen through food packages is important reason for food degradation and has effect on the shelf-life of the products (A L Brody, et al., *Journal of Food Science*, 2008, 73, R107; and J Lagaron, et al., *Materials Science and Technology*, 2004, 20, 1). Traditional barrier layer has been aluminium in foil or metallised form (Y Leterrier, *Progress in Materials Science*, 2003, 48, 1). Layers of barrier polymers such as poly(vinylidene chloride) (PVDC), poly(ethylene vinyl alcohol) (EVOH), poly(vinyl alcohol) (PVOH) and polyamide (PA) have sufficient properties, but are made from petroleum resources (G Strupinsky et al., A Twenty-Year Retrospective on Plastics: Oxygen Barrier Packaging Materials, San Francisco, Calif., 1998). Therefore, materials from renewable resources would be preferable for packaging applications.

New bio-based materials have been explored to develop barrier films (K S Miller et al., *Trends in Food Science & Technology*, 1997, 8, 228; K Petersen, et al., *Trends in Food Science & Technology*, 1999, 10, 52; A Gandini, *Macromolecules*, 2008, 41, 9491; A Gandini, *Green Chemistry*, 2011, 13, 1061-1083; S C M Fernandes, et al., *Green Chemistry*, 2009, 11, 2023; and T Kohnke, et al., *Green Chemistry*, 2012, 14, 1864). An interesting alternative is hemicelluloses, especially the widely available wood hemicelluloses and they have been extensively studied as oxygen barrier films (N M L Hansen et al., *Biomacromolecules*, 2008, 9, 1493; J Hartman, et al., *Biomacromolecules*, 2006, 7, 1983). However, wide-spread commercial application is still missing due to low average molar mass and difficulty in extraction in pure form.

High molar mass xyloglucan from tamarind seed waste has good film-forming and mechanical properties and remarkable oxygen barrier performance, at least at low humidity conditions (J Kochumalayil, et al., *Journal of Materials Chemistry*, 2010, 20, 4321; J J Kochumalayil, et al., *Biomacromolecules*, 2012, 14, 84; and WO 2012/150904). The oxygen permeability of xyloglucan (XG) at 50% RH is 0.5-2 $cm^3$ $\mu m^1$ $m^{-2}$ $day^{-1}$ $kPa^{-1}$ and is comparable to commercial barrier polymers such as PVOH or hemicelluloses derived from wood (Hansen, 2008). Mechanical properties and film forming characteristics of XG are more favourable than for wood hemicelluloses due to much higher molar mass.

Transmission of oxygen through a polymer film depends on many factors such as material structure, temperature, and humidity (Miller, 1997). The mechanism of $O_2$ transmission through polymer below glass transition temperature ($T_g$) is poorly understood. However, it is widely accepted that oxygen solubility, thermodynamics of polymer mobility and free volume factors contribute to the permeability below $T_g$ (M Klopffer, et al., *Oil & Gas Science and Technology*, 2001, 56, 223; H Fujita, *Fortschritte der Hochpolymeren-Forschung*, 1961, 1; and W W Brandt, *The Journal of Physical Chemistry*, 1959, 63, 1080). The high barrier performance of polar polymers such as PVOH, PVDC or polysaccharides arise from the combined factors of favourable chain packing, high cohesive energy density (defined as cohesive energy per unit volume) due to strong secondary interactions and low free volume (Lagaron, 2004). Strong intermolecular interaction and low oxygen solubility will limit $O_2$ permeation.

The oxygen barrier properties of highly polar polymers with high water solubility (PVOH or wood hemicelluloses or xyloglucan) become reduced when the polymer is exposed to high humidity. In order to get water-soluble polymers show good barrier properties at high humidity, the moisture sensitivity should be reduced so that significant intermolecular interactions are preserved under these conditions. This is a seemingly impossible enigma since hydrophobic modification leads to loss of water solubility, which is a disadvantage in the context of water-based green processing concept. Furthermore, intermolecular interactions may be substantially reduced (J Comyn, *Polymer permeability*, Elsevier Applied Science, London, 1985).

In WO 2012/150904 the oxygen barrier properties of xyloglucan coatings at high humidity was enhanced by creating a nanocomposite with a layered sodium-montmorillonite (MMT).

SUMMARY OF THE INVENTION

Thus there is a need for materials from renewable resources that show good oxygen barrier properties even at high humidities. The present invention aims to fulfil the above-identified need as well as other significant drawbacks within the art through providing films comprising xyloglucan.

In a first aspect, the present invention relates to films comprising a xyloglucan, characterized in that the xyloglucan comprises at most 11 mol % of galactose residues.

In a second aspect the present invention relates to a method for making a film according to claim 1, the method comprising
  a) dissolving xyloglucan in a solution,
  b) removing side chain galactose residues from the xyloglucan chain to obtain a modified xyloglucan,
  c) making a film of the modified xyloglucan obtained in step b).

In a further aspect, the present invention relates to the use of a film comprising a xyloglucan as an oxygen barrier, wherein the xyloglucan comprises at most 11 mol % of galactose residues.

DETAILED DESCRIPTION OF THE INVENTION

Figure 1:
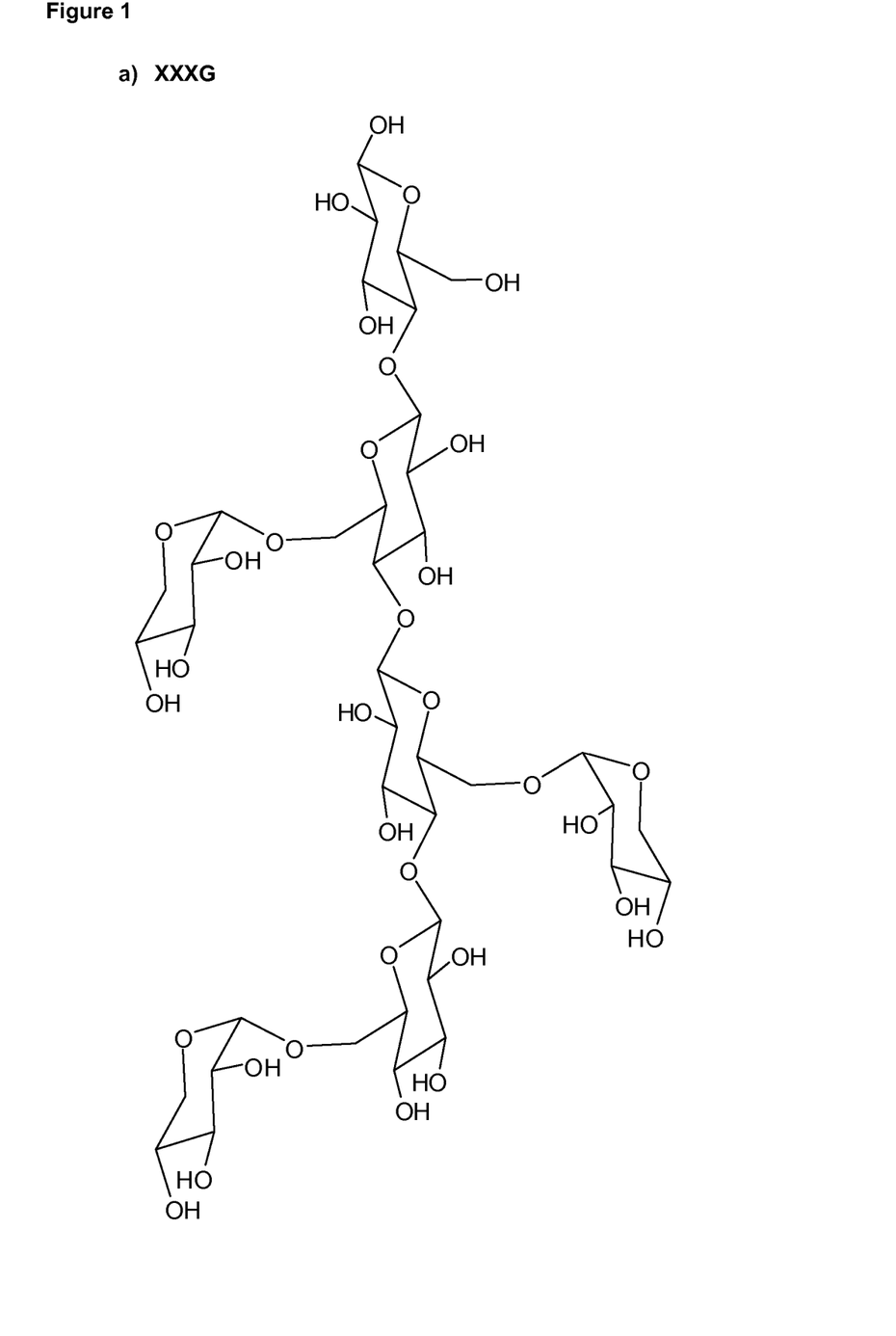
FIG. 1 shows the four basic repeating units of oligosaccharides present in tamarind seed xyloglucan.

Xyloglucan (XG) has a cellulose backbone with β-(1→4)-linked D-glucopyranose and up to 75% of glucose residues are substituted at O-6 position with α-D-xylopyranose branches. Some of these xylose residues are further substituted by an additional β-D-galactopyranose-rings (M J Gidley, et al., *Carbohydrate Research*, 1991, 214, 299; and H Urakawa, et al., *Trends in Glycoscience and Glycotechnology*, 2002, 14, 355) so that the branch contains two sugar residues. The basic repeat unit of tamarind seed XG can then be described in terms of four oligosaccharides, which differ in the number and distribution of galactose residues. They are conveniently represented as XXXG, XLXG, XXLG, and XLLG, where X represents a Xylp(α1→6)-Glcp side residue, L represents a Galp(β1→2)Xylp(α1→6)-Glcp side residue, and G represents a backbone Glcp residue (see FIG. 1) (S C Fry, et al., *Physiologia Plantarum*, 1993, 89, 1). The side residues are laterally linked in a flat conformation and gelation is not favoured due to the hydrophilicity of the side chains (Urakawa 2002). Xyloglucans are found as storage polysaccharides in seeds and tubers and also as cross-linking glycans in the cell wall of plants. In the context of the present invention, the xyloglucan polymers may derive from the seeds of the brown pod-like fruits from the tamarind tree (*Tamarindus indica*). Other sources may be flour obtained from for instance *Detarium senegalense, Afzelia africana*, and *Jatoba*. The xyloglucan polymer is soluble in water, yielding a highly viscous solution.

The present invention relates to films comprising a xyloglucan comprising at most 11 mol % galactose residues, as well as a method for making such films and their use as oxygen barrier, for example in packaging materials.

One object of the present invention is to provide a film comprising a xyloglucan, characterized in that the xyloglucan comprises at most 11 mol %, or at most 10 mol %, of galactose residues.

The galactose content of the xyloglucan used in the films according to the present invention can be determined by acid hydrolysis of the xyloglucan to individual sugar molecules using 70% sulphuric acid according to ASTM, E1758-01 (2003) Determination of carbohydrates in biomass by high performance liquid chromatography, In: *Annual Book of ASTM Standards*, 11; followed by analysis of the hydrolysates with high performance anion exchange chromatography equipped with Pulsed Amperometric Detector (HPAEC-PAD, Dionex ICS-3000) and using standard solutions of glucose, xylose and galactose for calibration (J J Kochumalayil, et al., Carbohydrate Polymers, 2013, 93, 466).

The xyloglucan used in a film according to the present invention may comprise at least 9 mol % of galactose residues.

A film according to the present invention may have an oxygen permeability at 80% RH and 23° C. that is not more than 7 cm$^3$ μm$^1$ m$^{-2}$ day$^{-1}$ kPa$^{-1}$, or not more than 3 cm$^3$ μm$^1$ m$^{-2}$ day$^{-1}$ kPa$^{-1}$, or not more than 2 cm$^3$ μm$^1$ m$^{-2}$ day$^{-1}$ kPa$^{-1}$.

The films comprising xyloglucan according to the present invention, may optionally comprise plasticizers such as glycerol, xylitol, sorbitol, maltitol, sucrose, glucose, fructose, xylose, polyethylene glycol, propylene glycol, butanediol, glycerine, urea or any combination thereof. An advantage with plasticizers is that they may reduce the brittleness of the films. Especially sorbitol efficiently influences the mechanical properties and reduces the brittleness. However, hydrophilic plasticizers may reduce the barrier performance at high humidity, but added in appropriate amounts the barrier properties may not be heavily influenced.

The films comprising xyloglucan according to the present invention may optionally comprise nanoparticles in order to for example improve barrier properties, mechanical properties or to add functionality to the films. The nanoparticles may be inorganic such as silica nanoparticles or clay, where clay shall be understood to pertain phyllosilicates or sheet silicates including but not limited to sodium-montmorillonite, kaolinite, chlorite and mica. The nanoparticles may also be organic including but not limited to nanofibrillated cellulose and cellulose nanocrystals.

The films comprising xyloglucan according to the present invention, may optionally also comprise other polymers including but not limited to hemicelluloses, lignin, lignosulfonates, cellulose derivatives, starch and other biopolymers or synthetic polymers.

The films according to the present invention, may comprise at least 50 wt %, at least 60 wt %, at least 70 wt %, at least 80 wt %, at least 90 wt %, at least 95 wt %, or at least 98 wt % xyloglucan based on the dry weight of the film.

The xyloglucan used in films according to the present invention may have a molecular weight of at least 10 kDa, at least 50 kDa, at least 100 kDa, at least 500 kDa, or at least 1 MDa. Further, the xyloglucan may have the molecular weight of 10 kDa-2 MDa, 50 kDa-2 MDa, 100 kDa-2 MDa, 500 kDa-2 MDa, or 1 MDa-2 MDa. The xyloglucan could also comprise a mixture of xyloglucans having different molecular weights or a distribution of molecular weights. A higher molecular weight has the advantage in that the film prepared from such xyloglucan will be less brittle, meaning that the amount of plasticizer may be reduced or even not required.

An advantage with films according to the present invention comprising a xyloglucan comprising at most 11 mol % galactose residues is that the chains of such xyloglucan may pack closer in the film, which provides less moisture uptake by the xyloglucan and less solubility in water of the xyloglucan and thus provide an improved oxygen barrier and mechanical properties of the film at high relative humidity.

A further advantage with the films according to the present invention comprising xyloglucan comprising at most 11 mol % galactose residues is that the increase in the packing of XG oligosaccharide segments means a decreased free volume and therefore the films will have high mechanical and oxygen barrier properties even in a high humidity compared with films prepared from xyloglucan comprising more galactose residues.

The xyloglucan used in the film according to the present invention may be a modified xyloglucan (modified XG) obtained by partial removal of galactose residues, for example by enzymatic digestion of xyloglucan with an enzyme, such as beta-galactosidase. Organic solvents can be avoided in the preparation of the modified XG, i.e. to achieve hydrophobic XG. In the films according to the present invention using modified XG, up to 43% of the galactose residues may be removed from xyloglucan obtained from *Tamarindus indica*.

The films comprising XG comprising at most 11 mol % galactose residues according to the present invention have significantly reduced solubility in water, or may even be insoluble in water.

Another advantage with the use of XG comprising at most 11 mol % galactose residues in the preparation of films according to the present invention is that the XG comprising at most 11 mol % galactose residues may be re-dissolved in water by a simple process of mechanical homogenization, such as with a high shear mixer or in a microfluidizer; and optionally together with sonication. The xyloglucan comprising at most 11 mol % galactose residues may also be dissolved in organic solvents, ionic solvents, or ionic liquids, or mixtures of these solvents with each other or with water, such as dimethylsulphoxide, N-methylmorpholine N-oxide, dimethylformamide, dimethylacetamide, dimethylacetamide/LiCl, 1,3-dimethyl-3,4,5,6-tetrahydro-2(1H)-pyrimidinone, NaOH (aq), LiOH/urea, NaOH/urea, ammonium hydroxide.

A further advantage is that the elastic modulus is increased, such as from 4.6 GPa for non-modified xyloglucan from *Tamarindus indica* up to 5.4 GPa for XG comprising at most 11 mol % galactose residues at 50% RH. Also the elastic modulus is better preserved for films of modified XG at high humidity. Moreover, at 80% RH, XG films prepared from XG comprising at most 11 mol % galactose residues may have a very low oxygen permeability, such as in the order of 1.5 cm$^3$ μm$^1$ m$^{-2}$ day$^{-1}$ kPa$^{-1}$. The better preservation of mechanical and barrier properties of XG comprising at most 11 mol % galactose residues is very significant in applications such as food packaging.

Another object of the present invention is a method for making a film comprising a xyloglucan comprising at most 11 mol %, or at most 10 mol %, of galactose residues, the method comprising
  a) dissolving xyloglucan in a solvent,
  b) removing the side chain galactose residues from the xyloglucan chain to obtain a modified xyloglucan,
  c) making a film of the modified xyloglucan obtained in step b).

More precisely, the method for making a film according to the present invention may comprise the steps of
  a) dissolving xyloglucan in a solvent,
  b) reacting the dissolved xyloglucan with an enzyme capable of removing the side chain galactose residues from the xyloglucan chain,
  c) making a film.

The solvent for dissolving the xyloglucan in step a) may be water, but also organic solvents, ionic solvents, ionic liquids, or mixtures of such solvents with each other or with water may be used, such as dimethyl sulfoxide (DMSO), N-methylmorpholine N-oxide, dimethylformamide, dimethylacetamide, dimethylacetamide/LiCl, 1,3-dimethyl-3,4,5,6-tetrahydro-2(1H)-pyrimidinone, NaOH (aq), LiOH/urea, NaOH/urea, ammonium hydroxide.

The time suitable/needed for the treatment of xyloglucan in step b) for removing a desired proportion of the side chain galactose residues depends on the conditions for the reaction, such as the enzyme concentration, pH, ionic strength and temperature.

The side chain galactose residues in xyloglucan may be removed by an enzyme, such as beta-galactosidase (EC 3.2.1.23). Different organisms, such as *Aspergillus oryzae*, can be the source of beta-galactosidase.

The enzyme may be allowed to react with the xyloglucan at a suitable enzyme concentration, such as between 0 and 250 mg enzyme/g of solid xyloglucan, preferably between and including 5 and 150 mg enzyme/g of solid xyloglucan, or more preferably between 10 and 100 mg enzyme/g of solid xyloglucan, or more preferably between 15 and 50 mg enzyme/g of solid xyloglucan or more preferably between 20 and 30 mg enzyme/g of solid xyloglucan.

The enzyme may be allowed to react with the xyloglucan at a suitable temperature for the enzyme, such as at a temperature of from 10 to 60° C., or 15 to 50° C., or 20 to 50° C., or 20 to 40° C., or 30° C.

The enzyme may be allowed to react with the xyloglucan at a suitable pH for the enzyme, such as at a pH of from 2 to 9, or from 3 to 8, or from 3.5 to 7, or from 4 to 5, or at pH 4.5.

The enzyme may be allowed to react with the xyloglucan at a suitable ionic strength for the enzyme, such as between and including 0 and 200 mM, or between and including 10 and 100 mM, or between and including 30 and 60 mM, or at 50 mM. The time for treatment of the xyloglucan with the enzyme depends on the conditions for the reaction, such as the enzyme concentration, pH, ionic strength and temperature.

Given an enzyme concentration of 25 mg enzyme/g of solid xyloglucan, a temperature of 30° C., a pH of 4.5 and an ionic strength of 50 mM sodium acetate the time for treatment of the xyloglucan with the enzyme may be at least 20 h, at least 30 h, at least 30 h, at least 50 h, or at least 60 h, for removal of the galactose residues.

The reaction in step b) may be terminated by deactivation of the enzyme, such as by heating, for example to 90° C.

Beta-galactosidase obtained from other sources than *Aspergillus oryzae*, may require different reaction conditions, concentrations, temperatures, pH and ionic strength.

The modified XG obtained in step b) may be precipitated, for example in ethanol, optionally followed by washing, such as in ethanol; and/or drying, for example in a vacuum oven, for example at 50° C. for 24 h.

The making of the film in step c) may include re-dissolving the modified xyloglucan obtained in step b). The modified XG may be re-dissolved in water together with mechanical homogenization, such as with a high shear mixer or in a microfluidizer; and optionally together with sonication.

The modified xyloglucan may also be dissolved in organic solvents, ionic solvents, ionic liquids, or mixtures of these solvents with each other or with water; such as in dimethylsulphoxide (DMSO), N-methylmorpholine N-oxide, dimethylformamide, dimethylacetamide, 1,3-dimethyl-3,4,5,6-tetrahydro-2(1H)-pyrimidinone, NaOH (aq), ammonium hydroxide, dimethylacetamide/LiCl, LiOH/urea, NaOH/urea.

The making of the film in step c) may be made by casting of, such as solvent casting or film casting; or coating with; the dissolved modified xyloglucan.

The present invention also relates to the use of a film according to the present invention as an oxygen barrier, such as in a food packaging.

The low oxygen permeability of the film according to the present invention even at high humidity makes it useful as an oxygen barrier, especially in packaging. Because of the possibility to produce the film without organic solvents and other possibly noxious substances, it is particularly suitable for use in food packaging. The present green methodology of enzyme hydrolysis of galactose side chains can be utilized for similar galactose—containing hemicelluloses such as galactoglucomannan in order to decrease the moisture sensitivity of such barrier materials at high humidity.

The method according to the present invention could also be applicable for molecular tailoring of other polymers with limited solubility in water, and yet with low moisture sorption and preserved physical properties at high humidity.

Increased packing of chain oligosaccharide segments, lowered water solubility, moisture content and lowered polymer mobility are believed to be reasons for the high barrier performance of xyloglucans comprising at most 11 mol % galactose residues at high humidity.

EXAMPLES

Materials
Enzymatic Modification of Xyloglucan.

The industrially available tamarind seed xyloglucan (weight average molecular mass, 1.5-2.0 MDa, Innovassynth technologies Ltd., India) was purified by centrifugation (4000 rpm for 45 min.) of 0.5 wt % dilute solution and freeze dried to obtain pure xyloglucan. 2 g of freeze-dried xyloglucan was dissolved in 80 ml of 50 mM sodium acetate buffer (pH=4.5). In order to remove the galactose side groups partially, 50 mg of β-galactosidase (from *Aspergillus oryzae*, Sigma Aldrich) dissolved in 5 ml of MilliQ water was added to the XG solution. The reaction mixtures were kept at 30° C. for different treatment times—24 h, 51 h and 64 h. The reactions were terminated after specified times by heating at 90° C. for 30 min. to deactivate the enzyme. The modified XGs (mXG) were purified by precipitation and washing in ethanol and dried in a vacuum oven at 50° C. for 24 h. The modified XG samples were insoluble or sparingly soluble in water with 64 h treated samples least soluble in water. The samples including non-modified xyloglucan from *Tamarindus indica* and modified XGs where the amount of galactose residues have been reduced (0.5 g) were mixed in 50 ml water under magnetic stirring overnight. The solutions were Ultra-turrax at 9500 rpm for 15 min. followed by sonication for 5 min. The cycle was repeated thrice, when most of the particle aggregates were soluble. The resultant solutions were centrifuged at 4000 rpm for 20 min. to remove any particle aggregates and the clear solution is used for film preparation. The above solutions were spread over Teflon-coated Petri dishes and placed on a leveled oven shelf at 35° C. overnight and the dried films were peeled off for further characterizations.

Characterization
Carbohydrate Analysis.

The galactose content in modified XG samples in comparison to non-modified xyloglucan from *Tamarindus indica* was determined by acid hydrolyses of the polymer to individual sugar molecules using 70% sulphuric acid (ASTM, E. (2003). 01 (2003) Determination of carbohydrates in biomass by high performance liquid chromatography. In Annual Book of ASTM Standards, 11). The hydrolyzates were analyzed using high performance anion exchange chromatography equipped with Pulsed Amperometric Detector (HPAEC-PAD, Dionex ICS-3000). Standard solutions of glucose, xylose and galactose were used for calibration (J J Kochumalayil, et al., *Carbohydrate Polymers*, 2013, 93, 466).

MALDI-TOF-MS.

Matrix-assisted laser desorption/ionization time-of-flight mass spectrometry (MALDI-TOF-MS) was performed on Ultraflex MALDI-TOF workstation (Bruker Daltonics, Bremen, Germany) equipped with a nitrogen laser (337 nm) and operated in positive reflector mode. About 2 mg of enzyme digested samples were dissolved in 1 ml of MilliQ water and 3 µL of sample solution was mixed with 6 µL of matrix (5 mg of 2,5-dihydroxy benzoic acid in 0.5 ml acetone) and spread over a MALDI-TOF plate (Bruker Daltonics) and air-dried. The ions were accelerated with a laser power of 21 kV.

Enzyme Hydrolysis:

Enzyme hydrolysis of XG and modified XG samples to resolve into component oligosaccharides were performed using Cellulase enzyme from *Trichoderma reesei* (EC 3.2.1.4) (Sigma Aldrich). About 80 mg of XG and modified XG samples were dissolved in 8 ml of 50 mM sodium acetate buffer (pH=5.0) in glass vials. 8 mg of enzyme was added to each solution and stirred for 24 h at 37° C. The enzyme reaction was terminated by increasing the temperature to 90° C. and kept stirring for half an hour. The resulting solutions were filtered through glass fibre filter paper (Whatman GF/A) and passed through 0.45µ PTFE syringe filters. The final filtrate was freeze dried and used for MALDI-TOF MS analysis.

Water Sorption.

A Dynamic Vapour Sorption (DVS) instrument from Surface Measurement Systems was used to determine the moisture uptake at different relative humidity atmospheres. XG and modified XG samples were first dried in the DVS cell, and then the relative humidity (RH) in the DVS cell was increased in steps from dry state up to 95%. The samples were weighed in different humidity atmospheres when the equilibrium state has reached. The moisture content (M) at a particular RH level was calculated on a dry basis:

$$M = \frac{W_w - W_d}{W_d} 100\% \qquad (1)$$

where M is the moisture content (%) of the sample at a particular humidity, $W_w$ is the weight of the sample in the DVS cell when the moisture content has reached steady state condition, and $W_d$ is the weight of the dried sample.

Tensile Properties:

The tensile properties of conditioned films were measured using an Instron 5944 system in tensile mode equipped with a 50 N load cell. The specimens were thin rectangular strips with a thickness of 30 µm, the width×length was 5 mm×60 mm and the gauge length was 40 mm. The samples were conditioned at desired humidity—50% RH and 92% RH—at 23° C. for at least one week. The stress-strain curves of specimen samples were recorded at room temperature and 50% RH at a strain rate of 10%/min. The elastic modulus was taken as the slope of the initial linear elastic region of the stress-strain curve and the tensile strength was determined as the tensile stress at specimen break.

Dynamic Mechanical Thermal Analysis (DMTA):

A dynamic mechanical thermal analyzer (TA Instruments Q800) operating in tensile mode was used to find the viscoelastic response of films as a function of temperature. Typical sample dimensions were a thickness of 30 µm and the width×length was 5 mm×20 mm. The measurement frequency and amplitude were kept at 1 Hz and 15 mm, respectively. A temperature scan was recorded in the range 25-300° C. at a heating rate of 3° C. min$^{-1}$ under ambient atmosphere. The storage modulus, E', loss modulus, E" and tan δ (defined as E"/E') were recorded. The Tg values were taken as the temperatures corresponding to tan δ peaks.

Oxygen Permeability:

The oxygen transmission rate (OTR) measurements were performed using Oxygen Permeation Analyzer (Systech 8001, Systech Instruments Ltd., UK) at 23° C. using 100% oxygen as test gas and nitrogen as carrier gas. Tests were done at dry condition and at 80% RH in both $N_2$ and $O_2$ flow. The active area of measurement was 5 cm$^2$ by using an aluminium mask. Oxygen permeability was estimated as the arithmetic product of OTR and thickness of the film.

Hansen's Solubility Parameter:

The basis of Hansen's solubility parameters (HSP) is that total (Hildebrand) cohesion energy density of a molecule can be expressed as the sum of three intermolecular interactions—dispersion forces (D), polar interactions (P) and hydrogen bonding (H) so that:

$$\delta^2 = \delta_D^2 + \delta_P^2 + \delta_H^2 \quad (2)$$

(C M Hansen, *Hansen solubility parameters: a user's handbook*, CRC, 2007), where $\delta_D$, $\delta_P$, and $\delta_H$ are termed Hansen's solubility parameters corresponding to the molecular interactions. $\delta_D$, $\delta_P$, and $\delta_H$ are calculated for individual oligosaccharides XXXG, XXLG/XLXG, and XLLG present in XG using a group contribution approach. $\delta$ is expressed as a point in a three dimensional space with $\delta_D$, $\delta_P$, and $\delta_H$ in x-, y-, and z-axis respectively. Then a solubility parameter "distance", Ra, between two oligosaccharides based on their respective partial solubility parameter components is defined as (Hansen, 2007):

$$(Ra)^2 = 4(\delta_{D2} - \delta_{D1}) + (\delta_{P2} - \delta_{P1}) + (\delta_{H2} - \delta_{H1}) \quad (3)$$

Ra for (XXXG–XXLG) and (XXXG–XLLG) were determined to get an idea of the affinity of XXXG oligosaccharides to other oligosaccharides with one and two galactose substitutions respectively. A smaller distance between oligosaccharide components indicates a larger affinity and stronger intermolecular interaction in this system Results We used mechanical homogenization and sonication to disintegrate the particle aggregates and the resultant solutions were solvent cast to form uniform films. The carbohydrate analysis results are presented in Table 1. In non-modified xyloglucan from *Tamarindus indica*, the molar ratio of galactose, glucose and xylose was 1:3:2.1, whereas in the enzyme modified XG with longest treatment time (64 h) it was 1:5.8:4.3, that is, 43% of galactose residues were removed compared to non-modified xyloglucan from *Tamarindus indica*, see Table 1 which presents the carbohydrate composition of XG and modified XG samples. Data are reported as mmols of carbohydrates/100 mg of sample. Designations mXG24, mXG51 and mXG64 for modified XG samples refer to time in hours for enzyme treatment. The last column show the amount in mol % of galactose left in the sample after modification.

TABLE 1

| Time of enzyme hydrolysis (hours) | Galactose[a] | Glucose[a] | Xylose[a] | Galactose removed (%) | Galactose content (mol %) |
|---|---|---|---|---|---|
| 0 | 0.086 | 0.256 | 0.183 | — | 16.4 |
| 24 | 0.057 | 0.272 | 0.190 | 34 | 11.0 |
| 51 | 0.051 | 0.283 | 0.204 | 41 | 9.5 |
| 64 | 0.049 | 0.284 | 0.209 | 43 | 9.0 |

[a]mmols of carbohydrates/100 mg of sample

Figure 2:
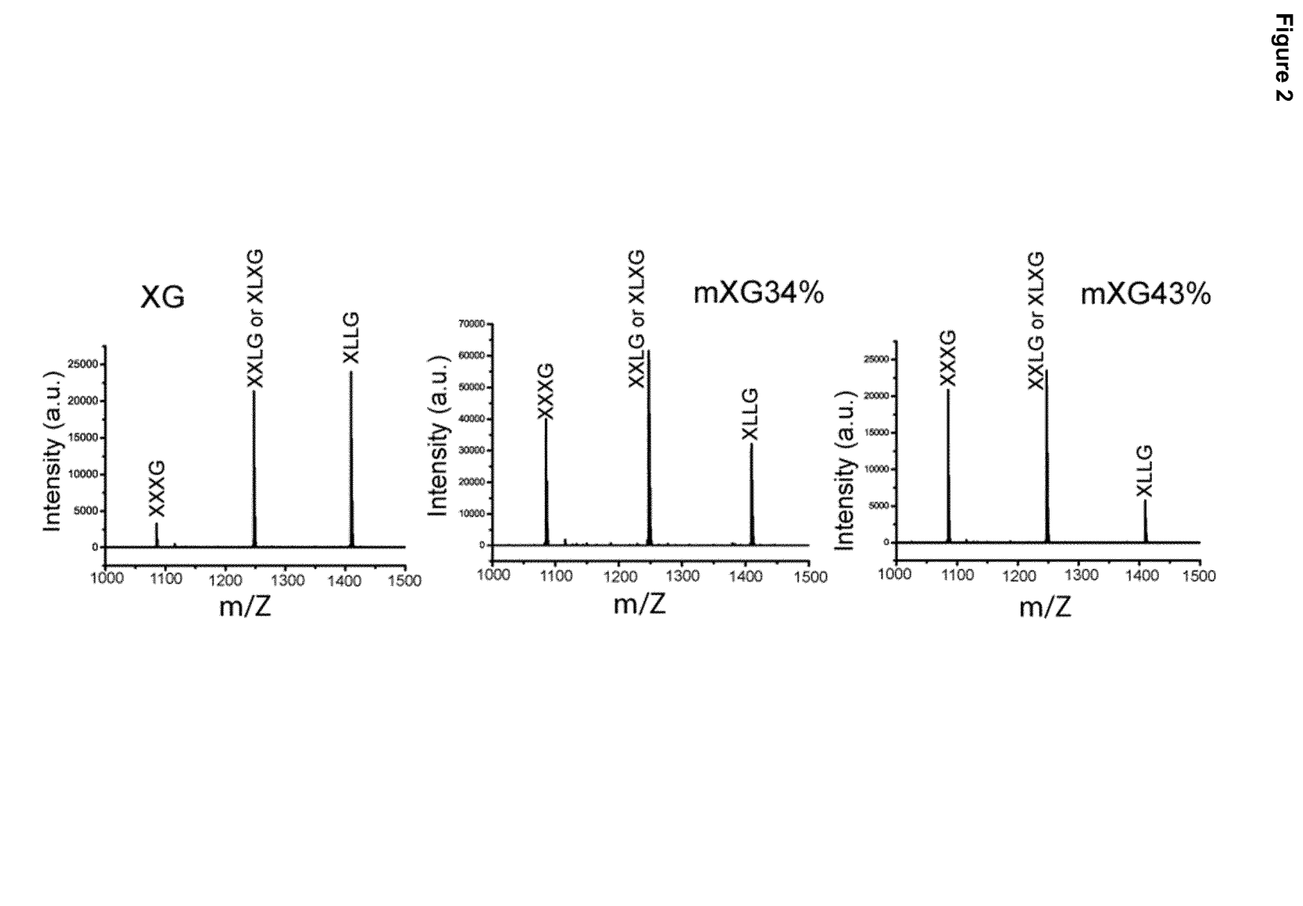
FIG. 2 shows MALDI-TOF MS data for xyloglucan oligosaccharides obtained by enzyme hydrolysis of non-modified xyloglucan (XG) obtained from *Tamarindus indica* and modified XG (m/Z values include atomic weight of Na+ counter ion).

XG has a unique composition of four oligosaccharides, viz. XXXG, XXLG, XLXG and XLLG, where XXXG has no galactose substitution, whereas XXLG/XLXG has mono- and XLLG has di-galactose substitutions. A qualitative picture using MALDI-TOF MS analysis (FIG. 2) showed that the intensity of XXXG and XXLG/XLXG fragments increases with time of enzyme treatment. That is, the concentration of galactose residues at XXLG/XLXG and XLLG oligosaccharides decreases and the amount of XXXG and XXLG/XLXG oligosaccharides in XG chains is increased. The modified XG chains thus consist of a large fraction of galactose-free oligosaccharides. In FIG. 2 the designations mXG34%, and mXG43% for modified XG samples refer to the amount of galactose removed after enzyme treatment.

The group contribution method and HSP calculation as described herein, and are used to predict the effect of galactose removal on molecular packing of modified XG chains. It has been suggested that denser molecular packing would lower permeability of smaller molecules such as $O_2$ and $H_2O$ (Lagaron, 2004; and Y Z Zhu Ryberg, et al., *Biomacromolecules*, 2011, 12, 1355-1362). The calculated HSP parameters—$\delta_D$, $\delta_P$, and $\delta_H$—i.e. Hansen's solubility parameters corresponding to molecular interactions in terms of dispersion forces (D), polar interactions (P) and hydrogen bonding (H)—for the three oligosaccharides, XXXG, XLXG/XXLG and XLLG are presented in Table 2.

TABLE 2

|  | $\delta_D$ (MPa)$^{1/2}$ | $\delta_P$ (MPa)$^{1/2}$ | $\delta_H$ (MPa)$^{1/2}$ |
|---|---|---|---|
| XXXG | 24.4 | 16.4 | 29.7 |
| XLXG/XXLG | 24.6 | 16.4 | 29.9 |
| XLLG | 24.7 | 16.3 | 30.0 |

Figure 3:
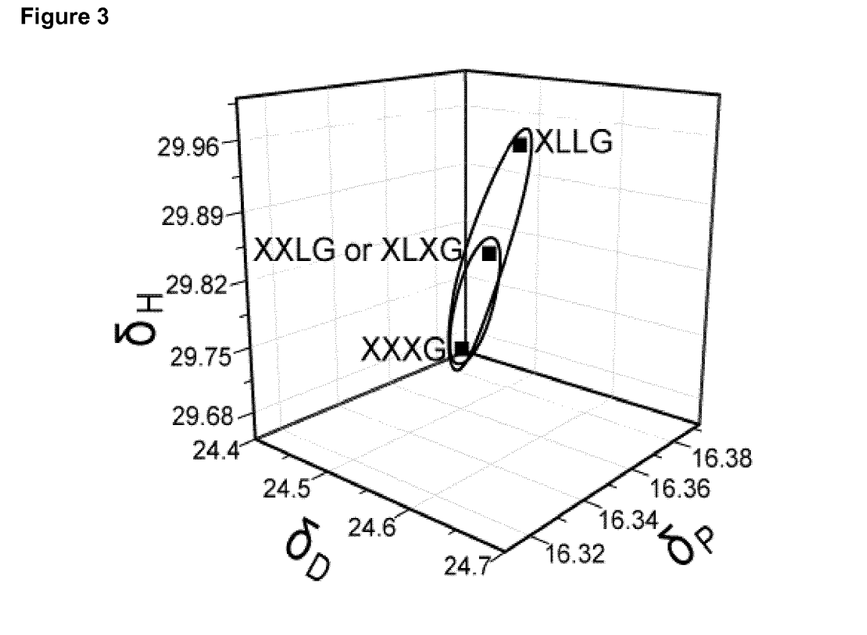
FIG. 3 shows Hansen's interaction "distance" in space calculated for (XXXG–XXLG/XLXG) and (XXXG–XLLG) oligosaccharide pairs in xyloglucan.
Figure 4:
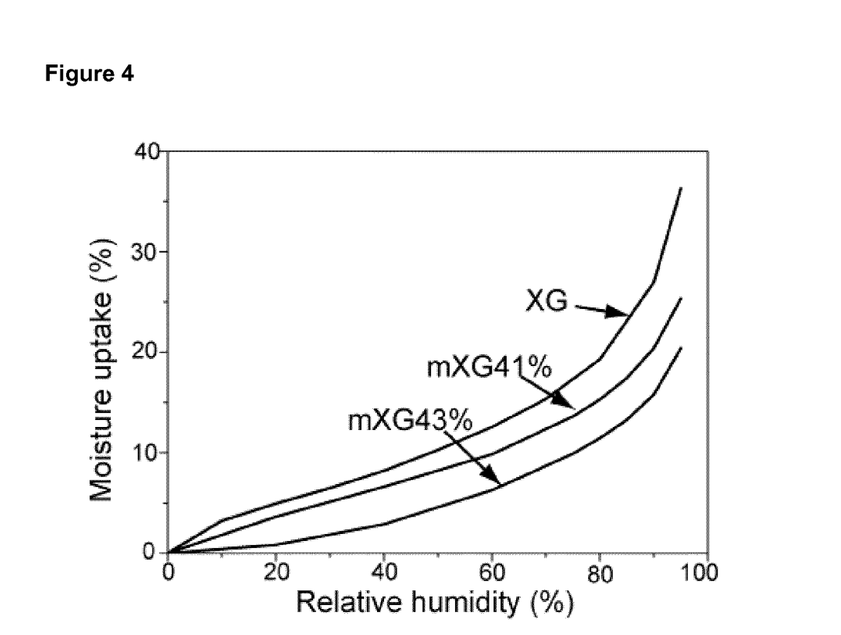
FIG. 4 shows moisture sorption isotherms for non-modified XG obtained from *Tamarindus indica* and modified XGs using Dynamic Vapor Sorption analysis.

The estimated distance of different oligosaccharides in space, Hansen's solubility parameter distance (see FIG. 3), Ra (XXXG–XXLG/XLXG) is 0.33 and Ra (XXXG–XLLG) is 0.56. A smaller value of Ra for the former pair indicates stronger intermolecular interaction for this system (Ryberg, 2011). The molecular level packing of XG chains is more dense at XXXG–XXXG chain segments than at XXXG–XXLG or XXXG–XLLG segments in XG with a flat conformation (Urakawa, 2002). Moisture uptake of XG and modified XG at different relative humidities are given in FIG. 4. In FIG. 4, the designations mXG41%, and mXG43% for modified XG samples refer to the amount of galactose removed after enzyme treatment. Modified XGs showed strong reduction in moisture uptake in all humidity ranges. In many applications, a candidate polymer needs low moisture uptake at high humidity, for example at 80% RH. The moisture uptake in this domain is higher since capillary condensation may start to dominate, and most polysaccharides show a sharp increase in moisture sorption in this region. At 80% RH, modified mXG43% samples showed 40% decrease in moisture uptake compared to non-modified xyloglucan from *Tamarindus indica*. Since the effective number of polar —OH groups in non-modified xyloglucan from *Tamarindus indica* and modified XGs is similar, this is a consequence of lowered water solubility and probably decreased free volume related to galactose removal.

Figure 5:
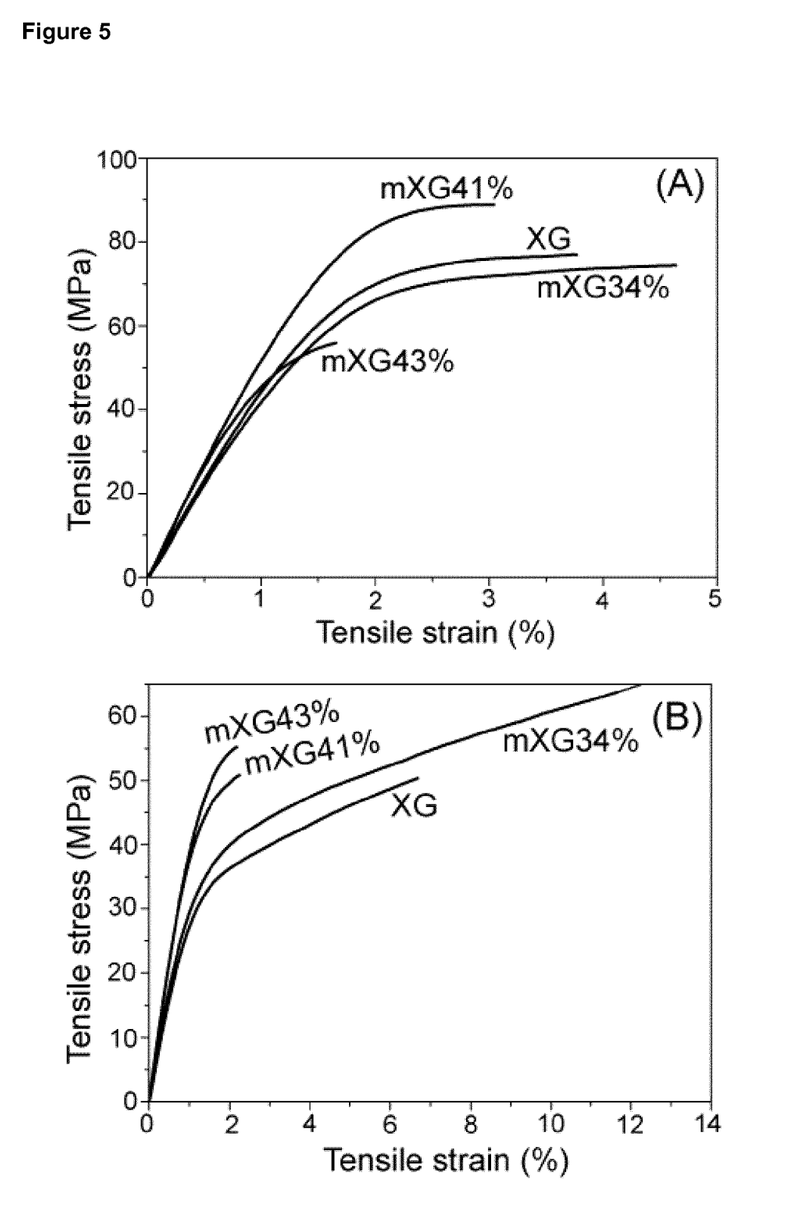
FIG. 5 shows typical tensile stress-strain curves for non-modified XG obtained from *Tamarindus indica* and modified XGs for samples conditioned at (A) 50% RH and (B) 92% RH and 23° C.

The effect of galactose removal on mechanical properties of films conditioned at 50% RH and 92% RH is given in Table 3 and typical stress-strain diagrams are presented in FIG. 5. In FIG. 5 the designations mXG34%, mXG41%, and mXG43% for modified XG samples refer to the amount of galactose removed after enzyme treatment.

TABLE 3

| Sample | Tensile strength, MPa | Tensile strain at break, % | Elastic modulus, MPa |
|---|---|---|---|
| Samples conditioned at 50% RH and 23° C. | | | |
| XG | 78 ± 8.6 | 5.7 ± 3.6 | 4597 ± 164 |
| mXG34% | 76.9 ± 4.3 | 5.9 ± 1.7 | 4714 ± 362 |
| mXG41% | 88.0 ± 0.7 | 2.8 ± 0.4 | 5429 ± 191 |
| mXG43%* | 55.9 ± 0.0 | 1.7 ± 0.4 | 5086 ± 164 |
| Samples conditioned at 92% RH and 23° C. | | | |
| XG | 51.1 ± 0.9 | 8.3 ± 1.0 | 3198 ± 121 |
| mXG34% | 72.4 ± 8.8 | 14.5 ± 2.1 | 3582 ± 12 |
| mXG41% | 55.2 ± 0.0 | 2.2 ± 0.1 | 3933 ± 481 |
| mXG43% | 51.3 ± 6.2 | 2.8 ± 0.7 | 4279 ± 305 |

*only two specimen samples were tested

Designations mXG34%, mXG41%, and mXG43% for modified XG samples in Table 3 above refer to the amount of galactose removed after enzyme treatment.

Elastic modulus for XG was 4.6 GPa and tensile strength was 78 MPa. The modified XGs did not show a uniform trend in stress-strain behaviour for samples conditioned at 50% RH. The relationship between galactose removal and tensile properties is complex. For instance, the molecular conformations in the cast XGs may be sensitive to differences in solution properties and details in the casting procedure. However, the Young's modulus increased significantly from 4.6 GPa to 5.4 GPa and 5.1 GPa for mXG41% and mXG43% samples respectively. The lower moisture uptake in the modified XGs is certainly one explanation. It is likely that intermolecular interactions may also be increased by shortening of the XG branches. It is interesting that the mXG41% shows significantly improved modulus and yield strength compared with the XG reference.

Tensile properties of films conditioned at 92% RH showed remarkable results. For most polysaccharides, water acts as a plasticizer and tensile properties decrease strongly with increased humidity. Although XG properties are well preserved, they are indeed decreased as the moisture content increases. As the galactose residues were removed from XG, the reduction in mXG mechanical properties at high humidity conditions, compare FIGS. 5A and 5B, are very limited. One of the compositions (mXG34%) even showed increased strain to failure and well preserved modulus and strength. The mXG43% samples showed an elastic modulus as high as 4.3 GPa whereas the non-modified XG from *Tamarindus indica* showed a modulus of 3.2 GPa at 92% RH. The samples treated for 24 h showed unusual toughness (area under tensile stress-strain curve) presumably due to an optimum level of moisture plasticization. It is interesting to note that in contrast to 50% RH, the stress after 92% RH conditioning increases with strain in the plastic range. The strain to failure values for mXG41% and mXG43% samples were very low but the moduli still high, see Table 3, indicating strong intermolecular interaction between XG chains.

Figure 6:
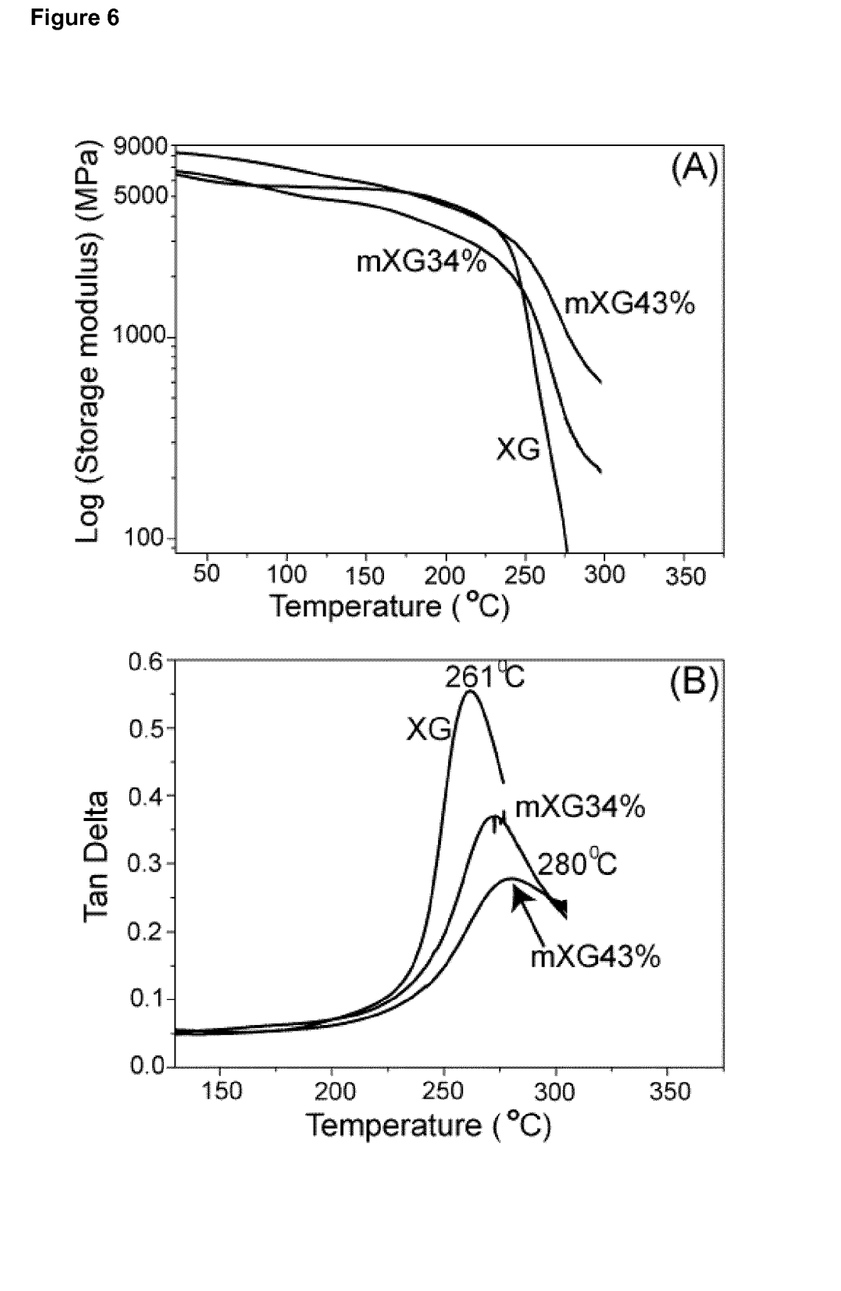
FIG. 6 shows the storage modulus and tan δ of non-modified XG obtained from *Tamarindus indica* and modified XG samples as a function of temperature.

The thermo-mechanical studies (FIG. 6) revealed that non-modified XG from *Tamarindus indica* shows a slight increase in storage modulus before the glass transition at 261° C. In contrast, modified XGs showed a steady decrease in storage modulus until the glass transition temperature was reached. The difference is due to differences in molecular mobility in modified XGs as a result of galactose removal. The glass transition temperature increased from 261° C. for non-modified XG from *Tamarindus indica* up to 280° C. with galactose removal (FIG. 6). This is consistent with reduced free volume in the polymer as the XG branches are shortened.

The oxygen barrier performance of non-modified XG from *Tamarindus indica* and modified XG films at dry conditions and 80% RH are presented in Table 4, which presents the oxygen transmission rate ($cm^3$ $m^{-2}$ $day^{-1}$) and oxygen permeability ($cm^3$ $\mu m^1$ $m^{-2}$ $day^{-1}$ $kPa^{-1}$) The comparison with polyvinyl alcohol (PVOH) was noticed. In the dry state, both non-modified XG from *Tamarindus indica* and modified XGs showed very low oxygen permeability of less than 1 $cm^3$ $\mu m^1$ $m^{-2}$ $day^{-1}$ $kPa^{-1}$.

TABLE 4

| Sample | Oxygen transmission rate (dry, 23° C.) ($cm^3 m^{-2} day^{-1}$) | Oxygen permeability (dry, 23° C.) ($cm^3 \mu m^1 \cdot m^{-2} day^{-1} kPa^{-1}$) | Oxygen transmission rate (80% RH, 23° C.) ($cm^3 m^{-2} day^{-1}$) | Oxygen permeability (80% RH, 23° C.) ($cm^3 \mu m^1 \cdot m^{-2} day^{-1} kPa^{-1}$) |
|---|---|---|---|---|
| XG | 0.5 | 0.1 | 40.2 ± 14.7 | 11.5 ± 1.6 |
| mXG24 (mXG34%) | 2.8 | 0.9 | 24.8 ± 8.1 | 6.4 ± 0.9 |
| mXG51 (mXG 41%) | a | a | 5.4 ± 2.0 | 1.5 ± 0.7 |
| mXG64 (mXG 43%) | a | a | 10.1 | 2.6 |
| PVOH | 1.86 | 0.384 | 92 | 20.4 | a: OTR for these films were below the detection limit of 0.008 $cm^3 m^{-2} day^{-1}$ At 80% RH, the oxygen permeability steadily decreased with removal of galactose side groups. In the best case for samples treated for 51 h, the permeability decreased eightfold compared to non-modified XG from *Tamarindus indica*.

The side sugar branches of xylose and galactose in non-modified xyloglucan hydrates in humid atmosphere, which causes films prepared from such xyloglucans to take up moisture which render molecular plasticization effects.

Xyloglucan can be considered as water-soluble although individual chains are not completely hydrated (D R Picout, et al., *Biomacromolecules*, 2003, 4, 799). From a practical point of view, the high molar mass XG is sufficiently soluble to be processed as a water solution. The presence of side chains—single xylose and two ring xylose-galactose combinations—has significant effect on the hydration and solubility of XG (Urakawa, 2002). Enzymatic removal of galactose side chains resulted in aggregation of XG chains. As the amount of galactose removal was increased, the resulting material was insoluble in water.

The invention claimed is:

1. A film comprising at least 95 wt % of a xyloglucan, based on the dry weight of the film, wherein the xyloglucan comprises 9-11 mol % of galactose residues, and wherein the film has an oxygen permeability at 80% RH and 23° C. that is not more than 7 $cm^3\mu m^1 m^{-2} day^{-1} kPa^{-1}$.

2. The film according to claim 1, wherein the xyloglucan comprises 9-10 mol % of galactose residues.

3. The film according to claim 1, wherein the film has an oxygen permeability at 80% RH and 23° C. that is not more than 3 $cm^3\mu m^1 m^{-2} day^{-1} kPa^{-1}$.

4. The film according to claim 1, wherein the film has an oxygen permeability at 80% RH and 23° C. that is not more than 2 $cm^3\mu m^1 m^{-2} day^{-1} kPa^{-1}$.

5. The film according to claim 1, further comprising one or more plasticizers.

6. The film according to claim 5, wherein the one or more plasticizers are selected from the group of glycerol, xylitol, sorbitol, maltitol, sucrose, glucose, fructose, xylose, polyethylene glycol, propylene glycol, butanediol, glycerine and urea, and combinations thereof.

7. The film according to claim 1, further comprising inorganic or organic nanoparticles.

8. The film according to claim 7, wherein the inorganic nanoparticles are silica nanoparticles or clay.

9. The film according to claim 8, wherein the clay is selected from the group of sodium-montmorillonite, kaolinite, chlorite and mica, and combinations thereof.

10. The film according to claim 7, wherein the organic nanoparticles are selected from nanofibrillated cellulose and cellulose nanocrystals.

11. The film according to claim 1, further comprising other polymers.

12. The film according to claim 11, wherein the other polymers are selected from the group of hemicelluloses, lignin, lignosulfonates, cellulose derivatives, starch and other biopolymers and synthetic polymers, and combinations thereof.

13. The film according to claim 1, wherein the xyloglucan has a molecular weight of at least 10 kDa.

14. The film according to claim 1, wherein the xyloglucan has a molecular weight of at least 1 MDa.

15. The film according to claim 1, wherein the xyloglucan comprises a mixture of xyloglucans with different molecular weights or a distribution of molecular weights.

* * * * *